United States Patent
Garfunkel

(10) Patent No.: US 7,173,795 B2
(45) Date of Patent: Feb. 6, 2007

(54) BIAS POINT ADJUSTMENT OF A READ HEAD BY MEANS OF AN EXTERNAL MAGNET

(75) Inventor: Glen Garfunkel, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 485 days.

(21) Appl. No.: 10/731,553

(22) Filed: Dec. 9, 2003

(65) Prior Publication Data

US 2005/0122632 A1 Jun. 9, 2005

(51) Int. Cl.
*G11B 5/127* (2006.01)
(52) U.S. Cl. ...................................... 360/313
(58) Field of Classification Search ................ 360/313, 360/319, 327.31, 324.12, 324, 317, 324.11, 360/324.2, 324.1
See application file for complete search history.

(56) References Cited

U.S. PATENT DOCUMENTS

| | | | | |
|---|---|---|---|---|
| 4,450,493 A | * | 5/1984 | Watrous | ............ 360/296.5 |
| 5,742,998 A | | 4/1998 | Jones, Jr. | ............ 29/603.14 |
| 6,798,623 B2 | * | 9/2004 | Seigler et al. | ............ 360/324 |
| 6,798,729 B1 | * | 9/2004 | Hurst et al. | ............ 369/119 |
| 7,035,061 B2 | * | 4/2006 | Singleton et al. | ...... 360/324.12 |
| 2004/0264049 A1 | * | 12/2004 | Brown et al. | ............ 360/234 |
| 2005/0141119 A1 | * | 6/2005 | Takeuchi et al. | ............ 360/66 |

\* cited by examiner

*Primary Examiner*—Allen Cao
(74) *Attorney, Agent, or Firm*—Saile Ackerman LLC; Stephen B. Ackerman

(57) ABSTRACT

Reader asymmetry control has become an important issue as track widths continue to shrink. This has been achieved by providing adaptive adjustment to the asymmetry of individual heads in the form of an additional permanent hard magnet, which may be internal or external to the head. This special 'tuning' magnet biases the shields and the sensor to achieve suitable asymmetry and/or amplification. Head bias adjustments may be done individually or in batch. Both the internal and the external magnet versions are described.

11 Claims, 2 Drawing Sheets

BIAS POINT ADJUSTMENT OF A READ HEAD BY MEANS OF AN EXTERNAL MAGNET

FIELD OF THE INVENTION

The invention relates to the general field of magnetic read heads with particular reference to read symmetry/bias point.

BACKGROUND OF THE INVENTION

Magnetic recording head asymmetry control is very important for head performance and yield. For current and future track widths, reader asymmetry control becomes a progressively more critical issue.

In the present invention we disclose a design which allows adaptive adjustment to asymmetry on individual heads by means of an additional special external or internal permanent hard magnet. This special 'tuning' magnet biases the shields and the sensor to achieve suitable asymmetry and/or amplification.

The biasing magnet of the present invention should not be confused with the permanent magnets used for longitudinal bias. Their purpose is the elimination of Barkhausen noise and they need to abut the sensor (specifically the free layer), which is not the case for the present invention. Furthermore, the tuning magnet of the present invention is set adaptively (its magnetization vector being adjustable) to compensate for head to head (first and second embodiments) or batch to batch (third embodiment) bias and asymmetry variations. The invention applies to all types of magnetic head including all sensor types.

A routine search of the prior art was performed with the following reference of interest being found:

Jones, Jr., in U.S. Pat. No. 5,742,998, discloses a magnetic head structure including a slider.

SUMMARY OF THE INVENTION

It has been an object of at least one embodiment of the present invention to provide a process for adjusting the bias point of a magnetic reader head.

Another object of at least one embodiment of the present invention has been that said process be applicable to read heads after their manufacture.

Still another object of at least one embodiment of the present invention has been to provide a read head whose bias point has been adjusted internally during manufacture.

A further object of at least one embodiment of the present invention has been that the application of the invention be independent of sensor type, longitudinal bias type, and current flow type.

These objects have been achieved by providing adaptive adjustment to the asymmetry of individual heads by means of an additional external permanent hard magnet. This special 'tuning' magnet biases the shields and the sensor to achieve suitable asymmetry and/or amplification. Alternately, batch tuning may be accomplished by use of an internal hard magnet for the same purpose. Both approaches are described.

DESCRIPTION OF THE PREFERRED EMBODIMENTS

Several embodiments are possible. In embodiments 1 and 2, the tuning (hard) magnet is external to the slider, so its position can be adjusted, as needed, before it is firmly secured in place. For these external magnets, encapsulation of the magnet in epoxy or other materials may be desired to avoid contamination. It is understood that, in all cases, special initialization procedures will be required depending on the tuning magnet and sensor design details, the respective coercivities, the active axis directions, etc. The "initialization" sets the desired magnetization direction and size to achieve the desired asymmetry tuning. In embodiment 3, the permanent tuning magnet is part of the head assembly itself.

We now proceed to a description of three embodiments. Each of these embodiments will be disclosed through a description of a process for its manufacture. Said description will also serve to describe the structure of each embodiment.

$1^{st}$ Embodiment

Figure 1:
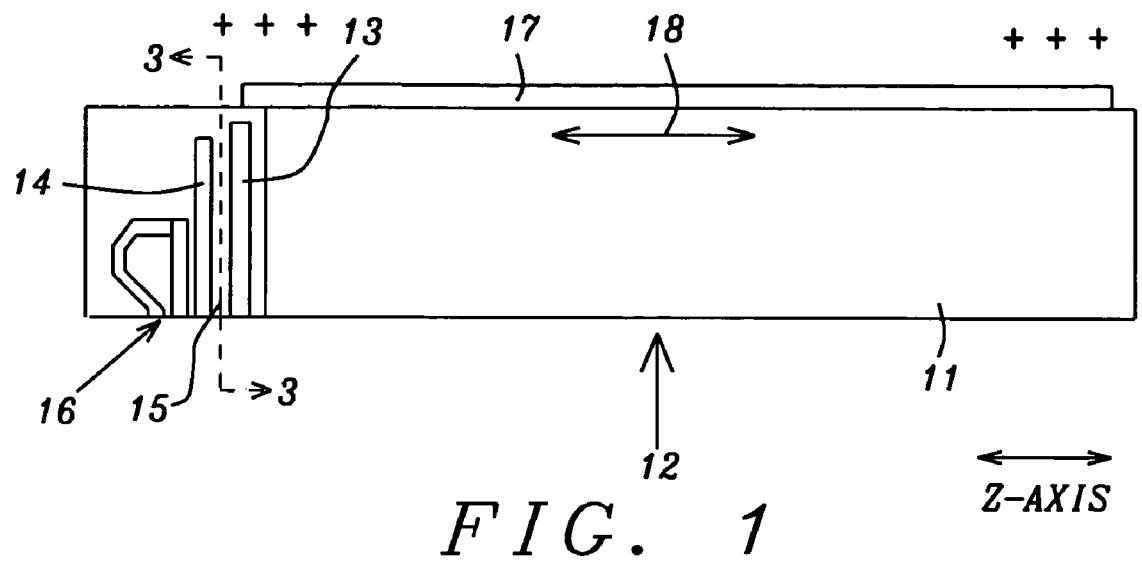
FIG. 1 Illustrates a first embodiment of the invention wherein an adjustable permanent magnet is located on the top surface of the slider.

Referring now to FIG. 1 the process for manufacturing the first embodiment begins with the provision of slider body 11 having an air bearing surface 12. A pair of parallel magnetic shields 13 and 14 are formed at one end of the slider body. The shields are positioned to overlap one another and both shields fully overlap magneto-resistive read sensor 15 that is sandwiched between them. The shields and the sensor stack together form the magnetic read head itself. The latter has an air bearing surface which is usually coplanar with that of the slider body. The full read-write head is completed with the fabrication of write head assembly 16, the latter not being novel.

A key novel feature of the invention is the presence on the top surface of slider 11 of adjustable permanent magnet 17, whose magnetic axis 18 is parallel to the aforementioned top surface. Magnet 17 serves to effect the polarization of shields 13 and 14 at the air bearing surface, which in turn affects the location of the sensor's bias point. An important advantage of this adjustability of the magnet is that it enables each magnetic read head to be custom tuned with respect to its bias point. Through either of several means, the permanent magnet's magnetization direction and magnitude are set (or adjusted) in order to tune the bias point of the head.

Note also that, during the above-described fabrication process, it is possible to individually shape the two shields. In particular, narrowing and tapering of the shields near the air bearing surface serves to enhance the tuning process discussed above. This will become clearer in the description of the third embodiment.

Once the optimum location for the tuning magnet 17 has been determined, it is routine to fix it in place (both to secure it as well as to protect it against possible contamination) by making a permanent bond between it and the slider head (using, for example, epoxy). This does not, however, rule out possible future applications in which the tuning magnet is secured in a manner that makes possible subsequent later adjustments of its position.

The exact environment in which the optimum state of the tuning magnet is determined will, of course, vary. An example of such an environment that is of particular importance is worth noting here and that is performing the bias point optimization in combination with perpendicular recording disk media having a magnetically soft underlayer.

The application of this embodiment is not dependent on what type of sensor is being used. Thus, it could be used for cases where the magneto-resistive read stack is a Giant Magneto-Resistance (GMR) sensor or a Magnetic Tunnel Junction (MTJ) sensor.

Similarly, the application of this first embodiment is not dependent on how the longitudinal bias (discussed in the background section) is applied. Examples of these include (but are not limited to) abutted hard bias, abutted exchange bias, and patterned exchange bias.

Finally, the method used to pass current through the sensor does not affect the application of the present invention. Thus, the magneto-resistive read stack could be a Current in Plane (CIP) type or a Current Perpendicular to Plane (CPP) type.

$2^{nd}$ Embodiment

Figure 2:
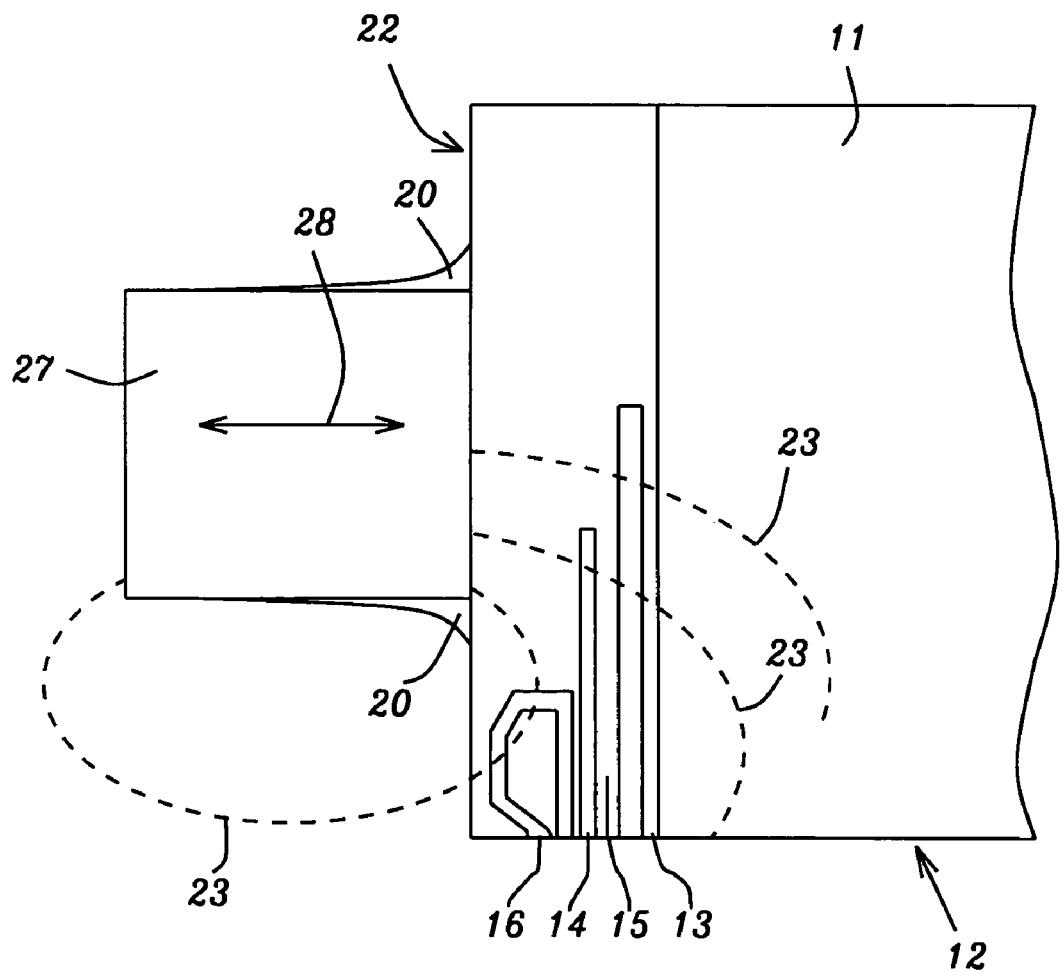
FIG. 2 Illustrates a second embodiment of the invention wherein an adjustable permanent magnet is located on the front surface of the slider.

We refer now to FIG. 2. The process of the second embodiment begins with the provision of slider body 11 having air bearing surface 12 and, on a surface normal to this, the read-write head is formed of the same elements already enumerated for the first embodiment.

The key novel feature (and principal difference from the first embodiment) of the second embodiment is the location where permanent (tuning) magnet 27 is placed. Magnet 27 is placed on end surface 22 of the finished read-write head. Magnetization axis 28 is normal to end surface 22 but other orientations are also possible.

It is also possible, in principle, to simultaneously use two magnets such as both 17 and 27 in the same device in order to be able to achieve even finer control of the bias point.

As in the first embodiment, the application of the invention is independent of sensor type, longitudinal bias type, and current flow type.

$3^{rd}$ Embodiment

In this embodiment, the permanent (tuning) magnet is internally located within the read-write head assembly. As already noted, this device may be cheaper to manufacture than the first two embodiments.

Figure 3:
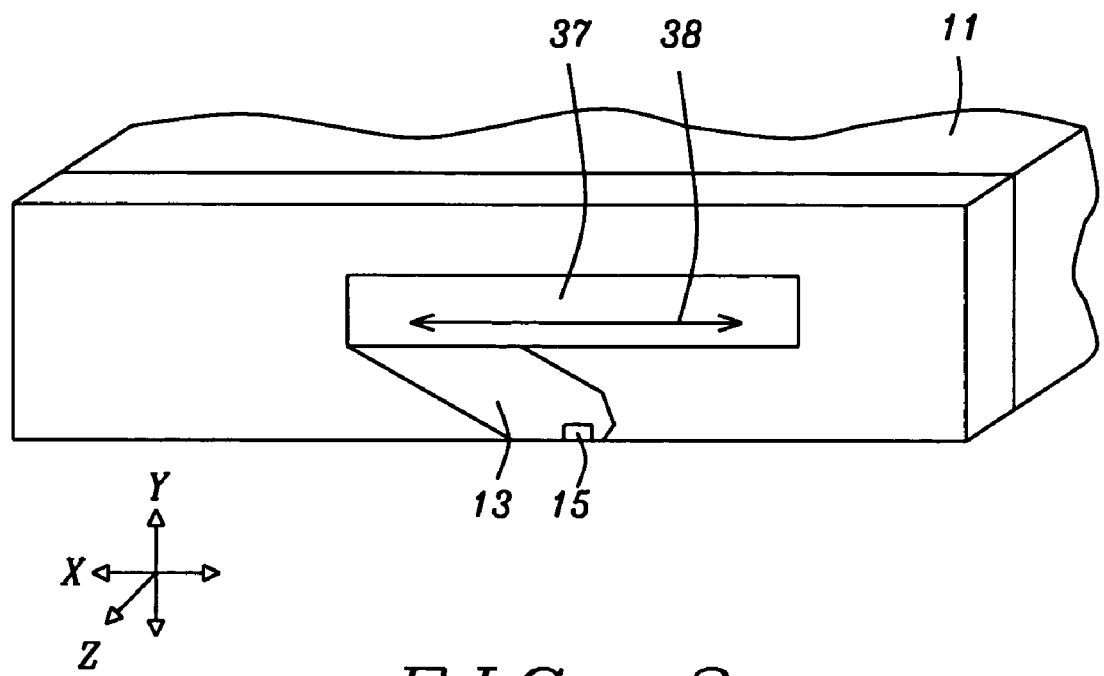
FIGS. 3 and 4 illustrate a third embodiment of the invention wherein said permanent magnet is internally located as part of the read sensor assembly.

Referring now to FIG. 3, the process of the third embodiment begins with the provision of slider body 11 on whose end face magnetic shield 13 is formed. Magneto-resistive read stack 15 is then formed over (as opposed to on) it. Shield 13 must fully overlap stack 15.

This is followed by the deposition, patterning, and magnetization (in direction 38 for example) of permanent magnet 37 which will normally contact shield 13 but must not overlap sensor stack 15. Formation of the read-head assembly concludes with the deposition and patterning of second magnetic shield 14 (see FIG. 1 or 2) that fully overlaps stack 15.

Figure 4:
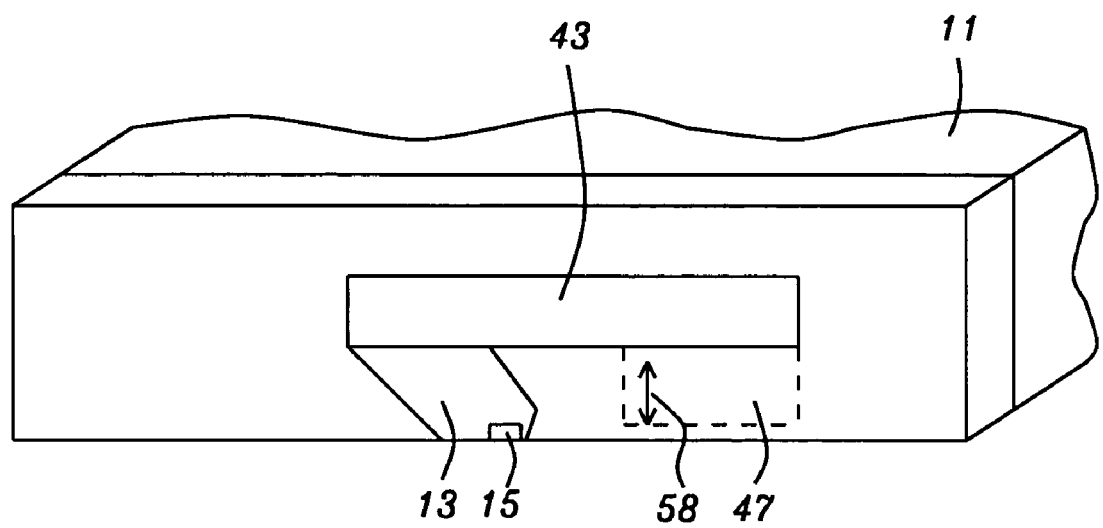

A variation on the third embodiment is illustrated in FIG. 4. The approximate initialization axis here may be as shown by 58 and may be perpendicular to that shown in FIG. 3. It is magnetically connected to magnetic shield 13 through magnetic shield extender 43. This embodiment is intended to show how alternate geometries may allow different (and possibly preferable) initialization directions.

As will have been noted, FIGS. 3 and 4 are cross-sections through 3—3 of FIG. 1 allowing the shapes of shields 13 and 14 to be seen. The narrowing and tapering of (one of) the shields is optional.

As in the first and second embodiments, the application of the invention is independent of sensor type, longitudinal bias type, and current flow type.

What is claimed is:

1. A method for tuning read head bias, comprising:
providing a slider body having an air bearing surface and an opposing top surface;
forming a pair of parallel and overlapping magnetic shields at one end of the slider body and sandwiching a magneto-resistive read stack between said shields to form a magnetic read head that has an air bearing surface which is coplanar with that of the slider body; and
mounting on said top surface a permanent magnet, thereby effecting polarization of the shields at the air bearing surface and enabling said magnetic read head's bias point to be tuned.

2. The method of claim 1 further comprising narrowing and tapering said shields near said air bearing surface thereby enhancing said tuning of the read head's bias point.

3. The method of claim 1 wherein the step of tuning the magnet read head with respect to its bias point is performed in combination with perpendicular recording disk media having a magnetically soft underlayer.

4. The method of claim 1 wherein said magneto-resistive read stack is a GMR sensor or a MTJ sensor.

5. The method of claim 1 wherein said bias point relates to a biasing scheme that is selected from the group consisting of abutted hard bias, abutted exchange bias, patterned exchange bias, and lead over-lay.

6. The method of claim 1 wherein said magneto-resistive read stack is a CIP type or a CPP type.

7. A read head that has been tuned for read head bias, comprising:
a slider body having an air bearing surface and an opposing top surface;
a pair of parallel and overlapping magnetic shields at one end of the slider body and a magneto-resistive read stack between said shields, together forming a magnetic read head that has an air bearing surface which is coplanar with that of the slider body; and
a permanent magnet, having a magnetic axis parallel to said top surface, mounted on said top surface.

8. The read head of claim 7 wherein said shields have been narrowed and tapered near said air bearing surface thereby enhancing said tuning of the read head's bias point.

9. The read head of claim 7 wherein said magneto-resistive read stack is a GMR sensor or a MTJ sensor.

10. The read head of claim 7 wherein said bias point relates to a biasing scheme that is selected from the group consisting of abutted hard bias, abutted exchange bias, and patterned exchange bias.

11. The read head of claim 7 wherein said magneto-resistive read stack is a CIP type or a CPP type.

* * * * *